United States Patent
Takiguchi et al.

(10) Patent No.: US 6,223,594 B1
(45) Date of Patent: May 1, 2001

(54) THERMAL TYPE AIR FLOW AMOUNT MEASURING APPARATUS HAVING FLOW RECTIFIER

(75) Inventors: Tomoyuki Takiguchi, Kariya; Ryo Nagasaka, Nagoya; Minoru Kondo, Chiryu; Yasushi Kohno, Kariya; Makoto Tsunekawa; Hideki Koyama, both of Okazaki, all of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/160,548

(22) Filed: Sep. 25, 1998

(30) Foreign Application Priority Data

Oct. 13, 1997 (JP) .................................................. 9-278886

(51) Int. Cl.[7] ............................... G01F 1/68; G01F 5/00; G01M 19/00
(52) U.S. Cl. ......................... 73/204.21; 73/202; 73/118.2
(58) Field of Search .................................. 73/118.2, 202, 73/202.5, 204.11, 204.21–204.27, 861.42, 861.52, 861.61, 861.63, 195, 196, 198

(56) References Cited

U.S. PATENT DOCUMENTS

| | | | |
|---|---|---|---|
| 3,559,482 | * | 2/1971 | Baker et al. ......................... 73/202.5 |
| 4,393,697 | * | 7/1983 | Sato et al. ............................. 73/118.2 |
| 4,562,731 | * | 1/1986 | Nishimura et al. ..................... 73/202 |
| 4,677,850 | | 7/1987 | Miura et al. . |
| 5,467,648 | * | 11/1995 | Igarashi et al. ...................... 73/202.5 |
| 5,595,163 | * | 1/1997 | Nogi et al. ......................... 73/204.21 |
| 5,672,822 | | 9/1997 | Sawada et al. . |
| 5,804,718 | * | 9/1998 | Nagasaka et al. ...................... 73/202 |
| 5,942,683 | * | 8/1999 | Aoi et al. ............................. 73/202.5 |

FOREIGN PATENT DOCUMENTS

| | | |
|---|---|---|
| 0 025 149 | 3/1981 | (EP) . |
| 0 685 713 | 12/1995 | (EP) . |
| 2 293 884 | 4/1996 | (GB) . |
| 2-41688 | 9/1990 | (JP) . |
| 5-24189 | 5/1993 | (JP) . |
| 6-23942 | 6/1994 | (JP) . |

OTHER PUBLICATIONS

Patent Abstracts of Japan, vol. 016, No. 141 (M1232), Apr. 9, 1992 & JP 04 001447 A (Japan Electron Control Syst Co Ltd), Jan. 6 1992.
Patent Abstracts of Japan, vol. 014, No. 357 ( M–1005), Aug. 2, 1990 & JP 02 125962 A (Hitachi Ltd), May 14, 1990.
Patent abstracts of Japan, vol. 097, No. 002, Feb. 28, 1997 & JP 08278179 A (Hitachi Ltd; Hitachi KAA ENG:KK), Oct. 22, 1996.

* cited by examiner

Primary Examiner—Benjamin R. Fuller
Assistant Examiner—Jagdish Patel
(74) Attorney, Agent, or Firm—Nixon & Vanderhye PC

(57) ABSTRACT

A thermal type air flow amount measuring apparatus is provided for measuring, a amount of air flowing in an air flow passage. The apparatus includes a bypass passage unit for bypassing a part of the air flowing through the air flow passage into the bypass passage. A flow amount measuring device is disposed in the bypass passage unit. A throttle unit is disposed upstream of the flow amount measuring device in the bypass passage unit and a support unit is disposed downstream over the throttle unit to support the flow amount measuring unit.

20 Claims, 4 Drawing Sheets

THERMAL TYPE AIR FLOW AMOUNT MEASURING APPARATUS HAVING FLOW RECTIFIER

CROSS REFERENCE TO RELATED APPLICATION

This application relates to and incorporates herein by reference Japanese Patent Application No. 9-278886 filed on Oct. 13, 1997.

BACKGROUND OF THE INVENTION

1. Field of the Invention

The present invention relates to an air flow amount measuring apparatus for measuring flow amount of air flowing in an air flow passage, which may be applied to an intake system of an internal combustion engine, for instance.

2. Related Art

Conventionally, thermal type air flow amount measuring apparatuses (air flow meters) are known as disclosed in Japanese Utility Model Publications No. 6-23942 and No. 5-24189.

In the air flow meter disclosed in Japanese Utility Model Publication No. 6-23942, a convex part is formed at the upstream side of a heater wire and a step is formed at the downstream-side terminal end of the convex part. This step at the downstream-side terminal end disturbs the flow of air and generates periodical vortexes. A thermal sensing unit responds to periodical variations in the flow speed caused by the vortexes, resulting in possible detection errors due to periodical variation.

In the airflow meter disclosed in Japanese Utility Model Publication No. 5-24189, a pair of dust-proofing members are provided for effectively restricting oil and dust from adhering on electrical leads of a hot film type sensing unit. Those dust-proofing members stabilize accuracy in measurement of the air flow amount by suppressing changes in the heat radiation characteristics of the sensing unit caused by an accumulation of dust.

SUMMARY OF THE INVENTION

It is an object of the present invention to provide a thermal type air flow amount measuring apparatus that accurately measures a flow amount of air.

It is another object of the present invention to provide a thermal type air flow amount measuring apparatus which rectifies a flow of air flowing to a sensing unit in a compact size.

For achieving the above object, an air flow amount measuring apparatus, a flow rectifying throttle unit is provided together with a thermal sensing unit in a bypass passage. Support members for supporting the thermal sensing unit are positioned downstream of the throttle unit at a behind or downstream position relative to the flow of air. As the thermal sensing unit is exposed in the flow of air rectified by the throttle unit, a measurement of flow amount can be attained stably under a condition in which turbulence is less likely to occur. Further, as dust in the air is less likely to adhere to the support members, an output of the thermal sensing unit can be maintained at a highly accurate value.

Preferably, the bypass passage is formed in an inverted U-shape, and the throttle unit is formed in an inlet-side bypass passage in which turbulence is less likely to occur. Further, support members of the thermal sensing unit are positioned behind (downstream of) the throttle part so that dust in the air is less likely to adhere to the support members. The bypass passage area is in a rectangular shape and the throttle part is provided on two parallel sides located at the same position in the air flow direction.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

The present invention will be described below with reference to the drawings showing an embodiment of the present invention. An air flow amount measuring apparatus (air flow meter) according to the present invention is applied to measure an intake air flow amount of an internal combustion engine.

Figure 5:
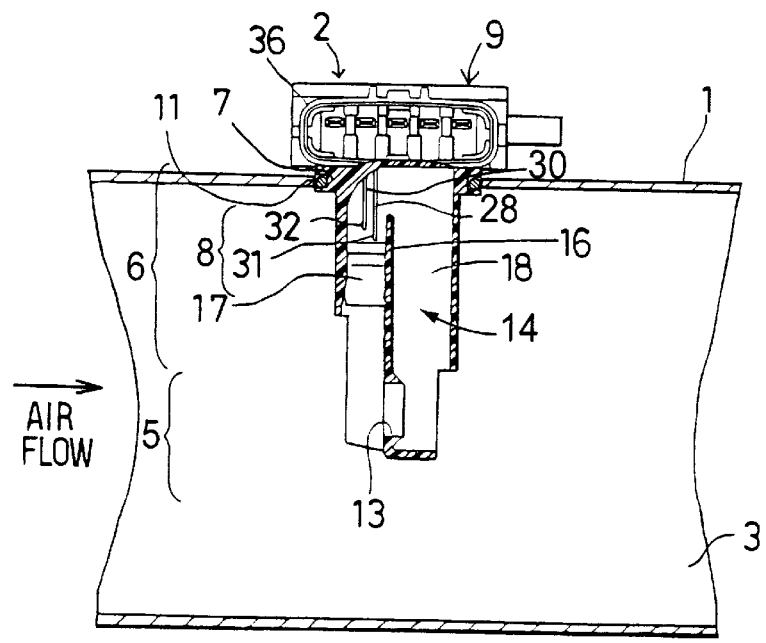
FIG. 5 is a sectional view showing an intake system of an engine with the air flow meter shown in FIG. 1.

As shown in FIGS. 1 to 5, particularly in FIG. 5, an air flow meter 2 is attached to a tubular intake pipe 1 of an internal combustion engine. The air flow meter 2 has an attachment unit 7, a venturi flow passage unit 5, a bypass flow passage unit 6, sensing unit 8 and a circuit module unit 9.

The attachment unit 7 is for attaching the air flow meter 2 to the intake pipe 1 and is plugged into an attachment hole 11 formed in the intake pipe 1. The attachment unit 7 is resin-molded integrally with the venturi flow passage unit 5 and the bypass flow passage unit 6, and extends in a radial direction of the intake pipe 1 transversely to the axial direction of the intake pipe 1.

The venturi flow passage unit 5 is positioned at a generally central part of an air passage 3 in the intake pipe 1. The venturi flow passage unit 5 has a venturi passage 13 which passes in the axial direction of the intake pipe 1 a part of intake air flowing in the intake pipe 1. The inner wall of the venturi passage 13 is disposed in parallel with the air passage 3 in the axial direction of the intake pipe 1.

Figure 1:
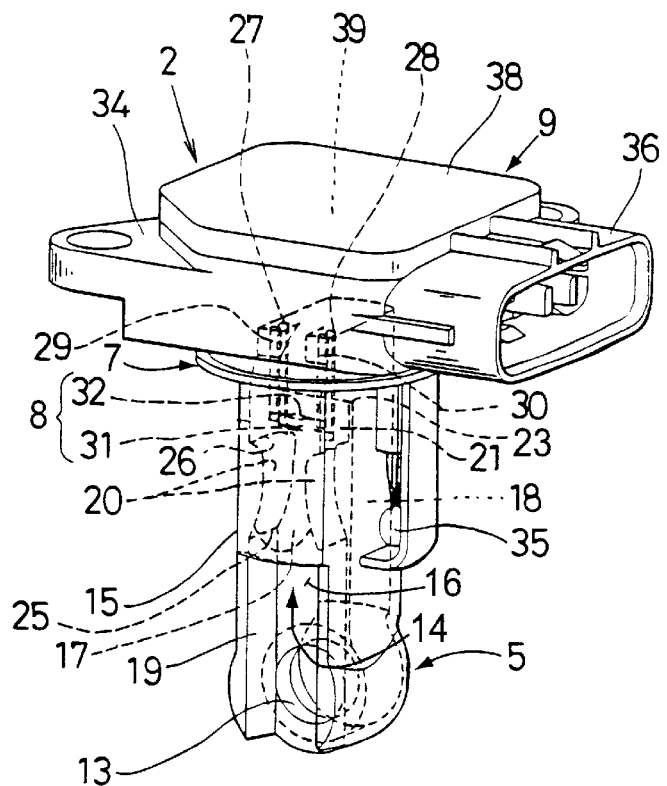
FIG. 1 is a perspective view of an air flow meter according to an embodiment of the present invention.
Figure 2:
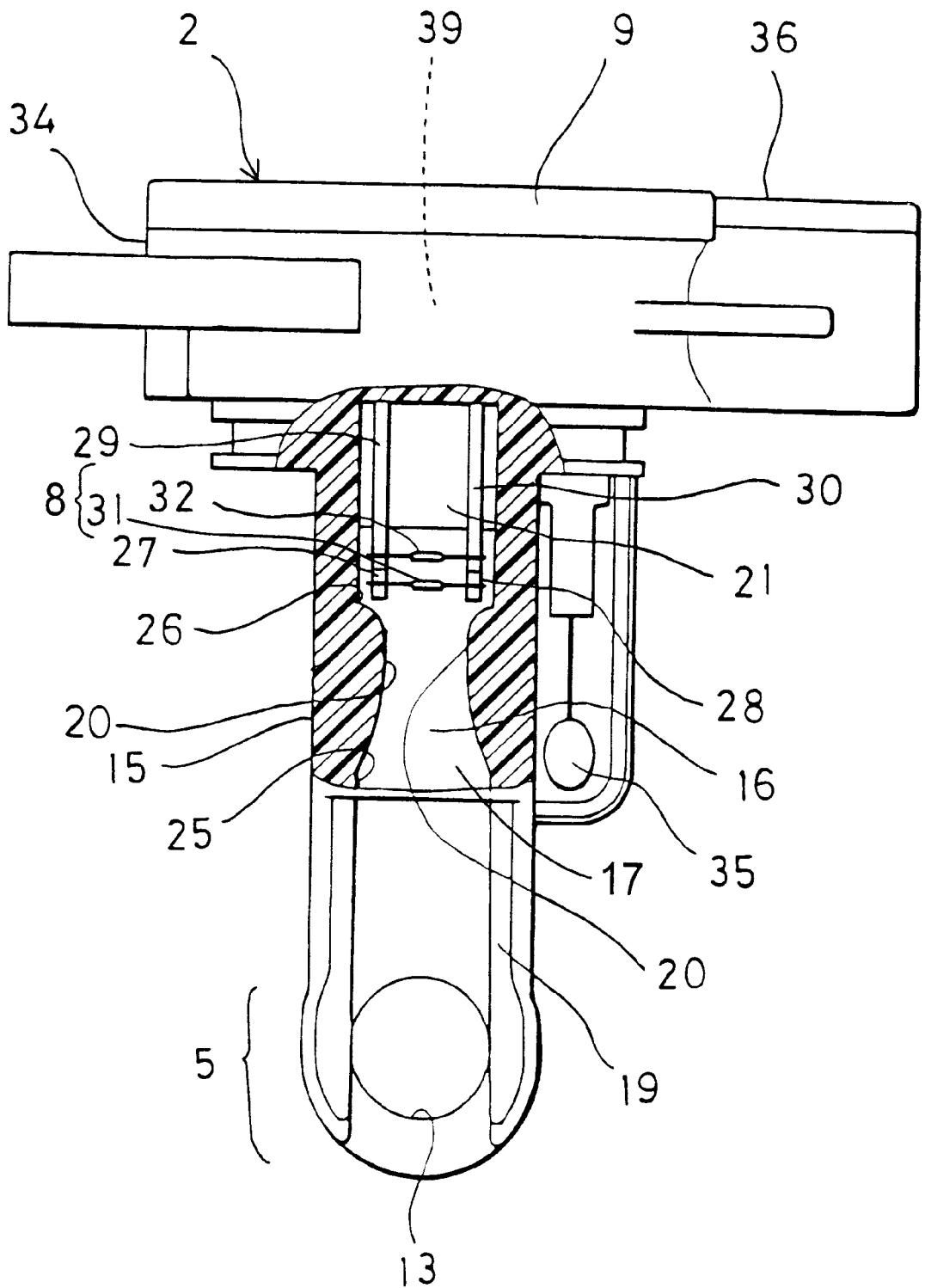
FIG. 2 is a side view showing partially in cross section the air flow meter shown in FIG. 1.
Figure 3:
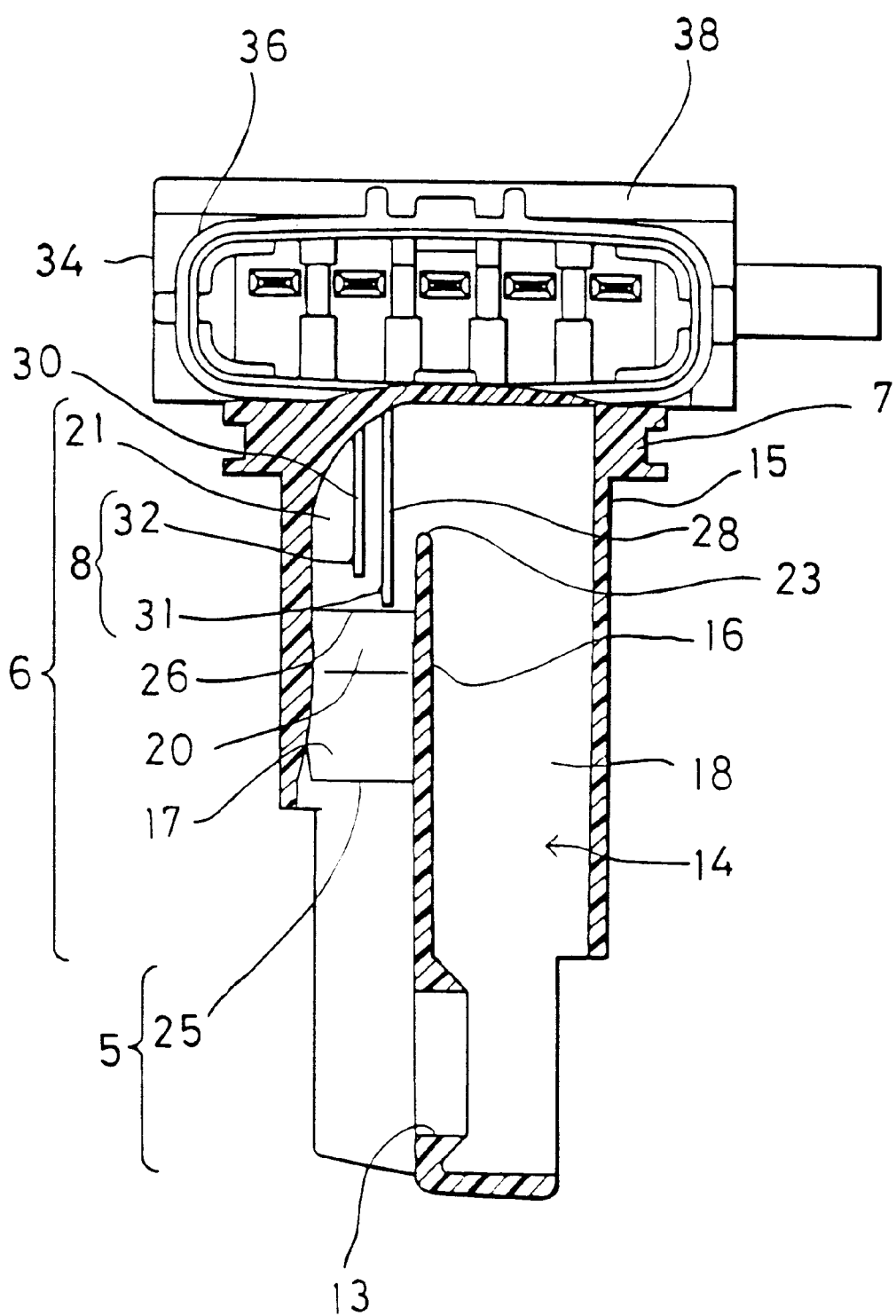
FIG. 3 is another side view showing partially in cross section the air flow meter shown in FIG. 1.

The bypass flow passage unit 6 is provided at a part connecting the attachment unit 7 and the venturi flow passage unit 5. As shown in FIGS. 1 to 3, the bypass flow passage unit 6 has a tubular outer pipe 15 and a partition wall 16 formed inside of the outer pipe 15. The outer pipe 15 has, in its inside, the partition wall 16 and a bypass passage 14 partitioned by the inner wall of the outer pipe 15 and the partition wall 16. The bypass passage 14 is formed in generally in an inverted U-shape passage and in a rectangular shape in transverse section. An inlet-side bypass passage 17 is provided at an upstream side of an upper end 23 of the partition wall 16, and an outlet-side bypass passage 18 is provided at a downstream side of the same. The bypass passages 17 and 18 are in communication with each other at the upper part of the partition wall 16 so that a part of intake air flows in the radial direction of the intake pipe 1.

As understood from FIGS. 1 to 3, a throttle unit 20 is formed as a flow rectifier on the inner wall of the outer pipe 15 in a manner to project as two convex parts from two parallel sides of the rectangular passage area, that is, from the two sides which are located at the same position in the axial direction of the intake pipe 1. The throttle unit 20 is not provided at the other two parallel sides of the rectangular passage area, that is, at the sides which are located at different positions in the axial direction of the intake pipe 1. The throttle unit 20 is in a convex shape for reducing a flow area of the inlet bypass passage 17. The throttle unit 20 is formed in the convex shape toward the center of the passage 17 between a throttle start end 25 and a throttle terminal end 26. Thus, as shown in FIG. 2, the transverse cross sectional area of the inlet-side bypass passage 17 reduces gradually and continuously from the upstream side (lower side in FIG. 2) to the downstream side (upper side in FIG. 2), reduces to a minimum and greatly and continuously increases at the downstream side of of the minimum point.

A throttle outlet-side space 21 is formed at the downstream side of the throttle terminal end 26 to have a normal effective opening area of the bypass passage 14. The throttle outlet-side space 21 terminates at the upper end 23 of the partition wall 16 and its downstream side is communicated with the outlet-side bypass passage 18.

The outlet-side bypass passage 18 is formed to have a generally uniform opening area from the attachment unit 7 to the venturi flow passage unit 5, and its lower terminal end is communicated with the venturi passage 13.

Figure 4:
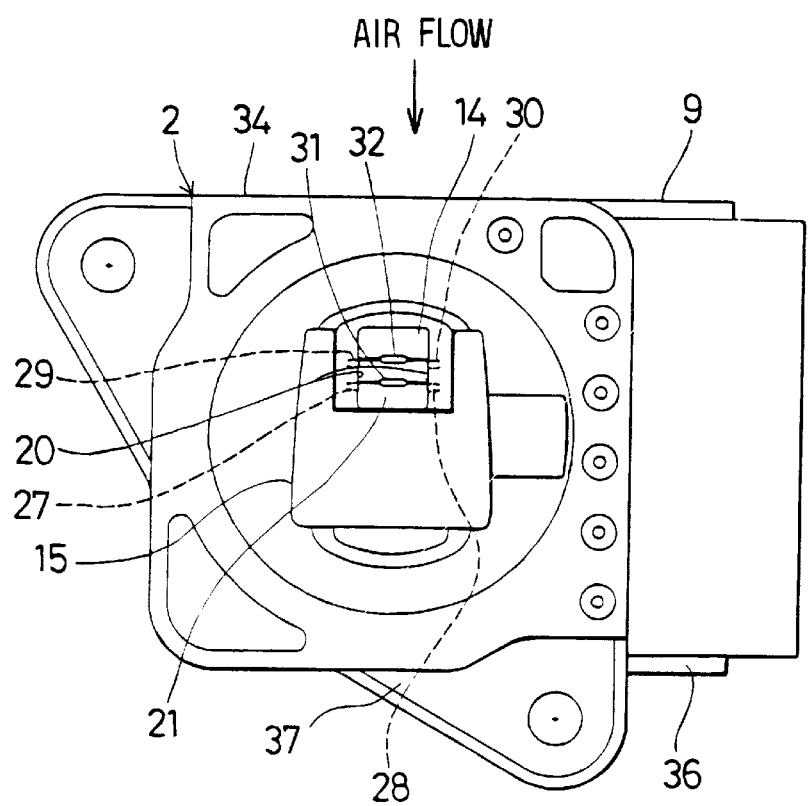
FIG. 4 is a bottom view of the air flow meter shown in FIG. 1.

The sensing unit 8 is provided at the throttle outlet-side space 21. The sensing unit 8 has a support unit (four bar-shaped support members 27, 28, 29, 30), and a flow amount measuring device comprising a heater element 31 and a temperature responsive element 32. Both ends of the heater element 31 are supported by the free ends of the support members 27 and 28, while both ends of the temperature responsive element 32 are supported by the free ends of the support members 29 and 30. The fixed ends of the support members 27, 28, 29, 30 are fixed to the inner wall of the attachment unit 7. The heater element 31 is provided slightly upstream (lower side) of the temperature responsive element 32 at an inside of the turn of the inverted U-shape bypass passage 14. The heater element 31 and the temperature responsive element 32 are provided downstream of the terminal end 26 of the throttle unit 20. As shown in FIGS. 2 and 4, the support members 27, 28, 29, 30 are provided at positions close to both inner walls of the outer pipe 15 so that those may be hidden behind the top of projection existing at the minimum transverse cross sectional passage area of the throttle part 20. In other words, the support members are positioned outside of peaks of the convex parts. Thus, most stable flow can be formed without generating turbulence in the air flowing through the throttle unit 20 of the inlet-side bypass passage 17, throttle terminal end 26 and throttle outlet-side space 21. The heater element 31 and the temperature responsive element 32 are disposed in a most stable air flow environment where the turbulence in the air flow is less likely to occur.

The circuit module unit 9 has a circuit part and a thermistor 35 as an air temperature measuring element which is positioned outside of the outer pipe 15 to measure the temperature of air in the air passage 3. The circuit has a housing 34, a control circuit 39, a heat radiation plate 37, a connector 36 and a cover 38. The circuit part controls an electric power supply to the heater element 31 and the temperature responsive element 32. The control circuit 39 is accommodated within the housing 34 made of resin.

In the above intake system, a part of intake air flowing in the intake pipe 1 enters into an inlet 19 formed at the bottom part of the outer pipe 15 of the air flow meter 2. The air entering into the inlet 19 is separated into a flow toward the venturi passage 13 and the inlet-side bypass passage 17. The air entering into the inlet-side bypass passage 17 flows at a higher speed at the downstream side of the venturi passage 13, thus generating a vacuum. This vacuum sucks the air in the outlet-side bypass passage 18 and raises the flow speed of the air flowing in the bypass passage 14. The control circuit 39 controls an electric current supplied to the heater element 31 so that the difference between the temperature of the heater element 31 calculated from the electric current supplied to the heater element 31 and the temperature of the temperature responsive element 32 may be maintained constant. The control circuit 39 thus produces this electric current as a flow amount detection signal as known in the art.

According to this embodiment, the flow of air entering into the inlet-side bypass passage 17 is rectified while passing through the throttle unit 20. The heater element 31 and the temperature responsive element 32 are disposed in the rectified air flow environment downstream of the throttle unit and between the convex parts, as shown in FIG 2. As the sensing unit 8 is disposed immediately downstream of the air passage formed by the throttle unit 20, the amount of air flow can be measured before the air flow is disturbed.

Further, as the flow speed is increased by the throttle unit 20, the accuracy in the flow amount measurement is raised to be higher. Further, as the heater element 31 and the temperature responsive element 32 are disposed in the most optimum environment in the throttle outlet-side space 21 of the inlet-side bypass passage 17 where the air flow is stable and the heater element 31 and the temperature responsive element 32 are exposed in the environment where the air flow is stable over a wide range of air flow amount from a small amount to a large amount, the accuracy in the flow amount measurement can be increased in the flow of air rectified by the throttle unit 20.

The air flow meter according to the above embodiment of the present invention was tested with respect to a range of variation of its output. The test was conducted under the following condition:

throttling ratio=minimum area of throttle unit/bypass passage area upstream of throttle unit.

In the first test, the relation between the air flow amount and the range of output variation was analyzed while maintaining the throttling ratio unchanged. In the second test, the relation between the air flow amount and the range of output variation was analyzed while changing the throttling ratio.

Figure 6:
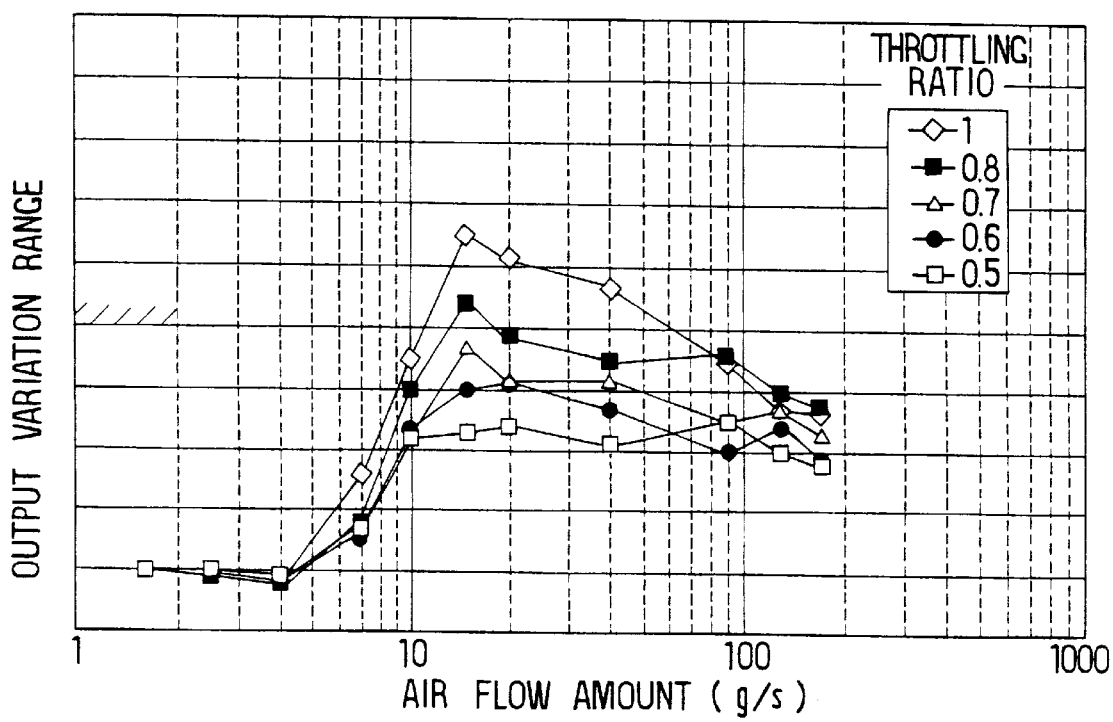
FIG. 6 is a graph showing experimental results of a relation between an air flow amount and an output variation range in the air flow meter shown in FIG. 1.

It is to be understood from FIG. 6 that the range of output variation is relatively large for any throttling ratios in a medium range of the air flow amount, for instance, 10–30 g/s. It is to be understood also that the range of output variation reduces for any throttling ratios as the air flow amount decreases in a small range of the air flow amount, for instance, less than 10 g/s. As understood from the graph in FIG. 6, with the throttling ratio being less than 0.7, the maximum value of the range of output variation is relatively small in almost the entire range of air flow amount from the small amount region to the large amount region. Therefore, it is understood that the throttle unit in the bypass passage advantageously stabilizes the output of the flow amount detection signal.

The present invention should not be limited to the above described embodiments but may be implemented in many other ways without departing from the spirit of the invention.

What is claimed is:

1. A thermal type air flow amount measuring apparatus for measuring an amount of air flowing in an air flow passage, comprising:
   a bypass passage unit for bypassing a part of the air flowing in the air flow passage, said bypass passage unit defining an air flow direction therethrough;
   a flow amount measuring device disposed in the bypass passage unit;
   a throttle unit disposed upstream of the flow amount measuring device in the bypass passage unit, said throttle unit including diametrically opposed convex parts, a throttled flow path being defined by most convex surfaces of said opposed convex parts, said flow amount measuring device being disposed in said throttled flow path downstream of and immediately adjacent said most convex surfaces; and
   a support unit disposed downstream from the throttle unit and downstream of the flow amount measuring device in said air flow direction to support the flow amount measuring device, the support unit being disposed laterally outside an axial extension of said throttled flow path and downstream of and proximate to said convex parts and disposed behind at least one of said convex parts with respect to said air flow direction, wherein said support unit is at least partially shielded by said at least one convex part from the air flowing through said bypass passage unit.

2. A thermal type air flow amount measuring apparatus as in claim 1, wherein:
   the bypass passage unit is in a U-shape having an inlet-side bypass passage and an outlet-side bypass passage; and
   the throttle unit is disposed in the inlet-side bypass passage.

3. A thermal type air flow amount measuring apparatus as in claim 2, wherein:
   the flow amount measuring device is disposed in the inlet-side bypass passage; and
   the throttle unit is disposed upstream of the flow amount measuring device in the inlet-side bypass passage.

4. A thermal type air flow amount measuring apparatus as in claim 1, wherein:
   the bypass passage unit has a bypass passage having a rectangular passage shape in section and the convex parts are formed on two, opposing sides of the bypass passage; and
   the support unit is disposed downstream of said convex parts, and axially aligned therewith so that said support unit is disposed within a transverse profile of said convex parts.

5. A thermal type air flow amount measuring apparatus as in claim 1, wherein said support unit comprises at least one rod.

6. A thermal type air flow amount measuring apparatus as in claim 5, wherein said at least one rod extends in the air flow direction.

7. A thermal type air flow amount measuring apparatus as in claim 5, wherein said at least one rod extends in said air flow direction to a wall of said bypass passage unit.

8. A thermal type air flow amount measuring apparatus as in claim 1, wherein said flow amount measuring device comprises a heater element and a temperature responsive element.

9. A thermal type air flow amount measuring apparatus as in claim 8, wherein the support unit comprises at least one rod for supporting each of said heater element and said temperature responsive element.

10. A thermal type air flow measuring apparatus for an internal combustion engine having an intake pipe, comprising:
    a bypass passage unit extending into the intake pipe transversely relative to an air flow direction in the intake pipe, the bypass passage unit having therein an inlet-side bypass passage and an outlet-side bypass passage, said inlet-side bypass passage and said outlet-side bypass passage communicating in a U-shape with the inlet-side bypass passage being positioned upstream of the outlet-side bypass passage in the air flow direction in the intake pipe;
    a throttle unit provided in the inlet-side bypass passage and projecting into the inlet-side bypass passage for rectifying a flow of air passing therethrough, the throttle unit having two convex parts projecting into the inlet-side bypass passage at a same axial position in an axial direction of the intake pipe, most convex surfaces of said convex parts defining a throttled air flow path;
    a thermal sensing unit disposed in the inlet-side bypass passage at a position immediately downstream of the most convex surfaces and in said throttled air flow path defined by the most convex surfaces for an air flow amount measurement; and
    a supporting unit for supporting said thermal sensing unit, said supporting unit being disposed downstream of said most convex surfaces and laterally outside an axial extension of said throttled air flow path defined by said most convex surfaces of said throttle unit, wherein said supporting unit is at least partly shielded by said most convex surfaces of said throttle unit from the air flowing between said most convex surfaces.

11. A thermal type air flow amount measuring apparatus as in claim 10, further comprising:
    wherein said supporting unit comprises a plurality of support members disposed downstream of the throttle unit for supporting the thermal sensing unit in the inlet-side bypass passage, the support members being positioned outside of peaks of the convex parts.

12. A thermal type air flow amount measuring apparatus as in claim 11, wherein:
    the inlet-side bypass passage has a generally rectangular passage shape in section; and
    the two convex parts extend from two opposing sides of the rectangular passage shape located at the same position in the air flow direction.

13. A thermal type air flow amount measuring apparatus as in claim 10, wherein:
    a throttling ratio of a minimum flow area in the throttle unit to a bypass passage area upstream of the throttle unit in the inlet-side bypass passage is less than 0.7.

14. An air flow amount measuring assembly as in claim 13, wherein said bypass passage has a generally rectangular passage shape in cross section and wherein said throttle unit is defined by two convex parts each projecting respectively from two opposing sides of said rectangular shaped passage, said convex parts being defined at a same axial position in an axial direction of the air intake pipe.

15. A thermal type air flow amount measuring apparatus as in claim 10, wherein said support unit comprises at least one rod.

16. A thermal type air flow amount measuring apparatus as in claim 15, wherein said at least one rod extends in the air flow direction to an axial end of said inlet side bypass passage.

17. A thermal type air flow amount measuring assembly comprising:

an air intake pipe having an air flow passage defined therethrough;

a bypass passage unit mounted to said air intake pipe so as to extend into said air flow passage, said bypass passage unit defining a bypass passage for bypassing a part of the air flowing through said air flow passage;

a flow amount measuring device disposed in the bypass passage of the bypass passage unit;

a throttle unit disposed in the bypass passage immediately upstream of the flow amount measuring device, said flow amount measuring device being disposed within an axial extension of a flow passage defined between most convex surfaces of convex parts of the throttle unit; and a support unit for supporting the flow amount measuring device, said support unit being downstream of the flow amount measuring device and being laterally outside of said axial extension of said flow passage defined between said most convex surfaces of the throttle unit and being at least partially shielded by said convex parts from the air flowing between said most convex parts.

18. A thermal type air flow amount measuring apparatus as in claim 17, wherein said support unit comprises at least one rod extending in the air flow direction.

19. A thermal type air flow amount measuring apparatus as in claim 17, wherein said flow amount measuring device comprises a heater element and a temperature responsive element.

20. A thermal type air flow amount measuring apparatus as in claim 19, wherein the support unit comprises at least one rod for supporting each of said heater element and said temperature responsive element.

* * * * *